(12) United States Patent
Winston et al.

(10) Patent No.: US 10,440,082 B1
(45) Date of Patent: Oct. 8, 2019

(54) ADJUSTING PARAMETER SETTINGS FOR BITRATE SELECTION ALGORITHMS

(71) Applicant: Amazon Technologies, Inc., Seattle, WA (US)

(72) Inventors: Amarsingh Buckthasingh Winston, Seattle, WA (US); Nicholas James Benson, Seattle, WA (US); Marc Joliveau, Seattle, WA (US); Lei Li, Kirkland, WA (US); Stefan Christian Richter, Seattle, WA (US); Li Tong, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 535 days.

(21) Appl. No.: 15/188,763

(22) Filed: Jun. 21, 2016

(51) Int. Cl.
*H04L 29/06* (2006.01)
*H04N 21/24* (2011.01)
*H04N 21/2387* (2011.01)
*H04N 21/2662* (2011.01)

(52) U.S. Cl.
CPC ........ *H04L 65/602* (2013.01); *H04L 65/4084* (2013.01); *H04N 21/2387* (2013.01); *H04N 21/2401* (2013.01); *H04N 21/2662* (2013.01)

(58) Field of Classification Search
CPC . H04L 65/4084; H04L 29/06; H04N 21/2387; H04N 21/2401; H04N 21/2662; H04N 21/24; H04N 19/102; H04N 21/845; H04N 19/164; H04N 21/2343; H04N 21/238; H04N 19/154
See application file for complete search history.

(56) References Cited

U.S. PATENT DOCUMENTS

| | | | |
|---|---|---|---|
| 8,898,303 B2* | 11/2014 | McGowan | G06F 9/06 709/203 |
| 9,521,178 B1 | 12/2016 | Gigliotti et al. | |
| 9,613,042 B1 | 4/2017 | Joseph et al. | |
| 2014/0095730 A1* | 4/2014 | Ozgur | H04W 4/70 709/231 |
| 2014/0258463 A1* | 9/2014 | Winterrowd | H04L 65/4084 709/219 |
| 2016/0100221 A1* | 4/2016 | Hiltch | H04N 21/2393 725/14 |
| 2016/0337680 A1 | 11/2016 | Kalagi et al. | |
| 2017/0034589 A1 | 2/2017 | Rozenberg et al. | |
| 2017/0331914 A1 | 11/2017 | Loach | |
| 2018/0041788 A1* | 2/2018 | Wang | H04N 21/2343 |

OTHER PUBLICATIONS

U.S. Appl. No. 15/188,758, filed Jun. 21, 2016, Winston, et al.
WAP-248-UAPROF-20011020-a, Version 20, Oct. 2001 (Year: 2001).
U.S. Office Action dated Jan. 2, 2019 issued in U.S. Appl. No. 15/188,758.

\* cited by examiner

*Primary Examiner* — Hitesh Patel
*Assistant Examiner* — Eui H Kim
(74) *Attorney, Agent, or Firm* — Weaver Austin Villeneuve & Sampson LLP (57) ABSTRACT

Techniques are described for adjusting parameter settings for bitrate selection algorithms for devices streaming media content. Control parameter settings are selected for playback of first media content. Test parameter settings are selected for playback of second media content. If the test parameter settings result in better playback performance relative to the control parameter settings, the test parameter settings become the new control parameter settings.

18 Claims, 6 Drawing Sheets

ADJUSTING PARAMETER SETTINGS FOR BITRATE SELECTION ALGORITHMS

BACKGROUND

Media content may be streamed over distributed networks for playback on client devices using adaptive bitrate selection algorithms. Initiating a streaming session involves providing parameter settings to a client device for various algorithm parameters. These parameter settings are configurable, but are typically entered manually by an administrator and are intended to be used by algorithms operating on a large and diverse population of client devices. The parameter settings are selected by the administrator to optimize performance of the algorithms for typical network conditions. However, given the diversity of client devices and the range of network conditions experienced by each, this approach often leads to negative user experiences.

DETAILED DESCRIPTION

This disclosure describes techniques for optimizing parameter settings for bitrate selection algorithms for different segments of a population of devices streaming content. Streaming sessions are identified according to session characteristics (e.g., geographic location and device type). Within each segment of sessions, control parameter settings are sent to devices corresponding to a subset of each segment. Test parameter settings are sent to devices corresponding to another subset of each segment. If the test parameter settings result in better playback performance relative to the control parameter settings, the test parameter settings become the new control parameter settings, and new test parameter settings are generated. In this way, parameter settings suitable for particular session types may be refined over time.

Figure 1:
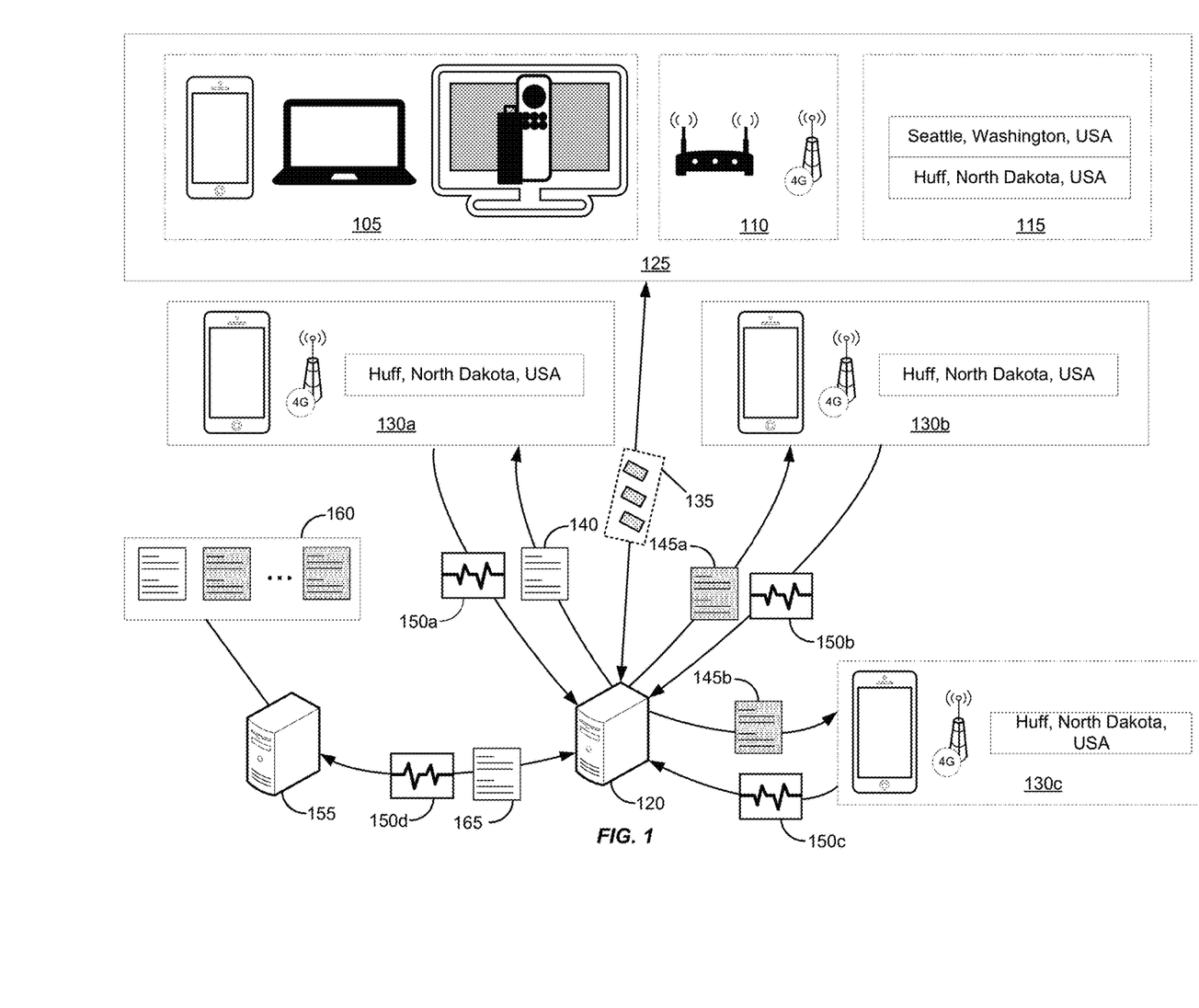
FIG. 1 illustrates an example of adjusting parameter settings for bitrate selection algorithms.

A particular implementation is described with reference to FIG. 1. Media server 120 processes requests for playback of media content 135. Upon processing of these requests, streaming sessions 125 are established, allowing communication between client devices and media server 120. Customer sessions of a video streaming service are segmented according to common characteristics such as, for example, device type 105, communication type 110, and geographic location 115 location (e.g., sessions streaming video on tablets via wifi in Seattle, Wash.). Combinations of device type 105, communication type 110, and geographic location 115 are further divided into a control subset 130a and a test subset 130b. In the depicted example, the control and test subsets 130a and 130b are similar in that they include the same kind of client devices streaming media content in Huff, N. Dak. on mobile devices using a cellular data network.

As understood by those of skill in the art, a variety of parameters control various aspects (e.g., bitrate, buffer size, time to first frame) of adaptive bitrate selection algorithms. The video streaming service provides parameter settings for the adaptive bitrate algorithms on client devices connecting to the service that are intended to be optimal for the streaming sessions with common session characteristics. In order to fine-tune the parameter settings for a given segment, test parameter settings 145a that are different from control parameter settings 140 are provided to client devices corresponding to test subset 130b. For example, a test parameter setting for the test subset 130b might represent an increase in buffer size relative to the corresponding setting for the control subset 130a. The video streaming service captures and stores performance data (e.g., at quality assurance server 155 with performance data 165) for the sessions in both subsets. After capturing performance data for a sufficiently reliable number of sessions, performance data 150a of the test subset 130b is compared to the performance data 150b of the control subset 130a. If the comparison indicates that the increase in buffer size resulted in a better playback experience for the test subset, then the increased buffer size becomes the parameter setting for sessions in the control subset, and new test parameter settings are provided to client devices corresponding to a new test subset. For example, test parameter settings 145b are provided to client devices corresponding to test subset 130c, which returns performance data 150c, thus enabling the ongoing optimization of parameter settings. This approach may be used to generate and optimize parameter settings for adaptive bitrate selection algorithms across a wide variety of session types.

Figure 2:
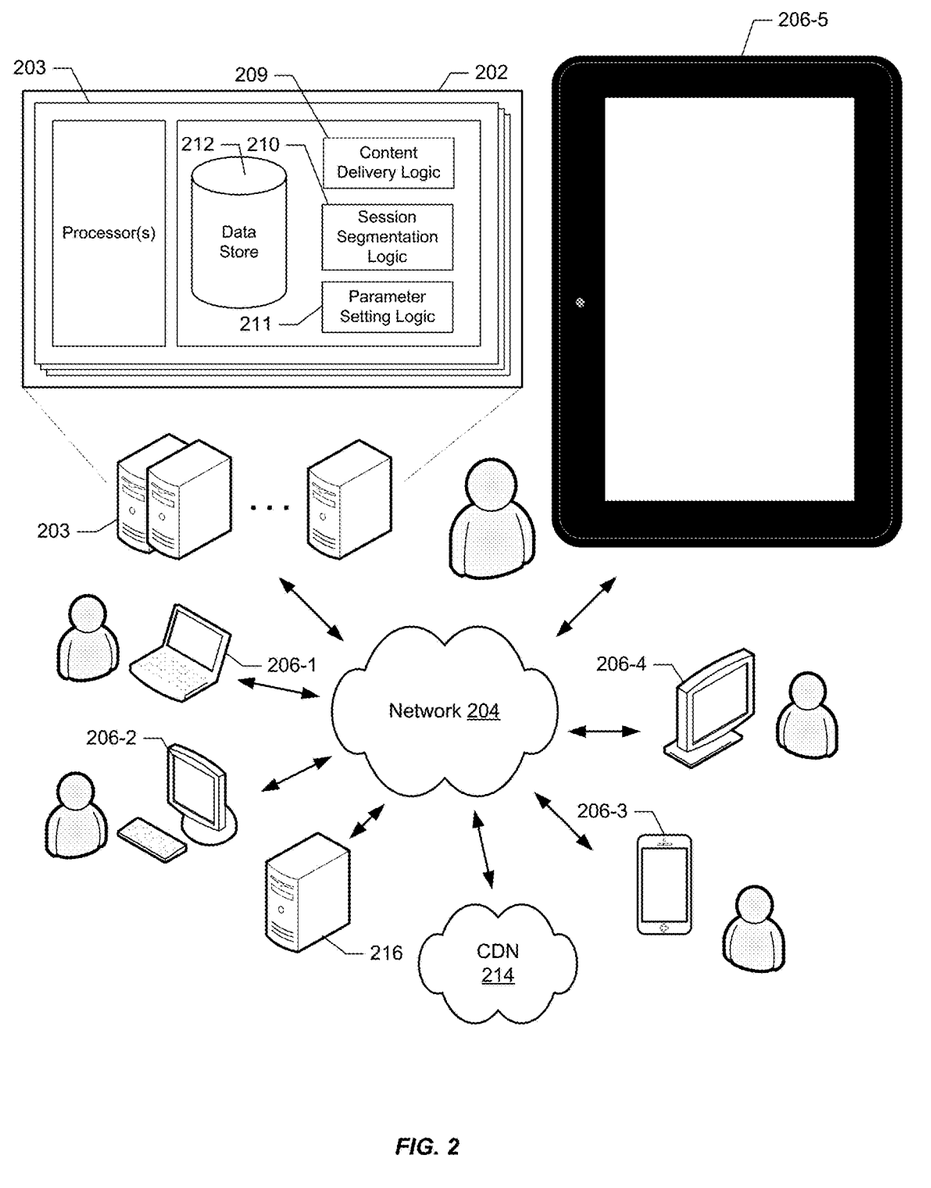
FIG. 2 is a simplified diagram of an example of a network computing environment in which various implementations may be practiced.

FIG. 2 illustrates an example of a computing environment in which a video content service 202 provides live streaming content and on-demand content (e.g., audio or video) via network 204 to a variety of client devices (206-1 through 206-5) in accordance with the techniques described herein. Content service 202 includes content delivery logic 209 which facilitates various aspects of content delivery to client devices 206. Content service 202 may conform to any of a wide variety of architectures such as, for example, a services platform deployed at one or more co-locations, each implemented with one or more servers 203. Network 204 represents any subset or combination of a wide variety of network environments including, for example, HTTP networks, TCP/IP-based networks, telecommunications networks, wireless networks, satellite networks, cable networks, public networks, private networks, wide area networks, local area networks, the Internet, the World Wide Web, intranets, extranets, etc. Client devices 206 may be any suitable device capable of connecting to network 204 for streaming on-demand and live streaming content provided by service 202. Such devices may include, for example, mobile devices (e.g., cell phones, smart phones, and tablets), personal computers (e.g., laptops and desktops), set top boxes (e.g., for cable and satellite systems), smart televisions, gaming consoles, wearable computing devices (e.g., smart watches), etc.

At least some of the examples described herein contemplate implementations based on computing models that enable ubiquitous, convenient, on-demand network access to a shared pool of computing resources (e.g., networks, servers, storage, applications, and services). As will be understood, such computing resources may be integrated with and/or under the control of the same entity controlling content service 202. Alternatively, such resources may be independent of content service 202, e.g., on a platform under control of a separate provider of computing resources with which content service 202 connects to consume computing resources as needed.

It should also be noted that, despite any references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations.

In the following examples and for the sake of simplicity, content service 202 is described as if it were integrated with the platform(s) that provides the live streaming content to client devices. However, it will be understood that content service 202 may provide access to on-demand and live streaming content in conjunction with one or more content delivery networks (e.g., CDN 214) that may or may not be independent of content service 202. The range of variations known to those of skill in the art are contemplated to be within the scope of this disclosure.

In the example shown, content service 202 includes logic configured to make decisions relating to generating and optimizing parameter settings as enabled by the present disclosure (e.g., as represented by parameter setting logic 211). For example, such logic might be configured maintain parameter settings for different subsets within each segment of streaming sessions, and provide parameter settings to client devices associated with the various segments and subsets of streaming sessions. Content service 202 is also shown as including logic configured to identify and segment streaming sessions according to session characteristics, e.g., geographic location, device type, etc. (e.g., as represented by session segmentation logic 210). Logic 210 and 211 might be implemented, for example, as a part of server 203 as shown in the figure. However, it should be understood that alternative implementations are contemplated in which at least some of the functionality represented by this logic may be implemented on a separate platform (e.g., server 216, CDN 214, client devices 206, etc.).

In addition to providing access to media content, content service 202 may also include a variety of information related to the live streaming content (e.g., associated metadata and manifests in data store 212 to which service 202 provides access.

Alternatively, such information about the media content, as well as the media content itself may be provided and/or hosted by one or more separate platforms, e.g., CDN 214. It should be noted that, while logic 209, logic 210, logic 211, and data store 212 are contemplated as integrated with content service 202, implementations are contemplated in which either or both operate remotely from the associated content service, and/or either or both are under the control of an independent entity. From these examples, those of skill in the art will understand the diversity of use cases to which the techniques described herein are applicable.

Figure 3:
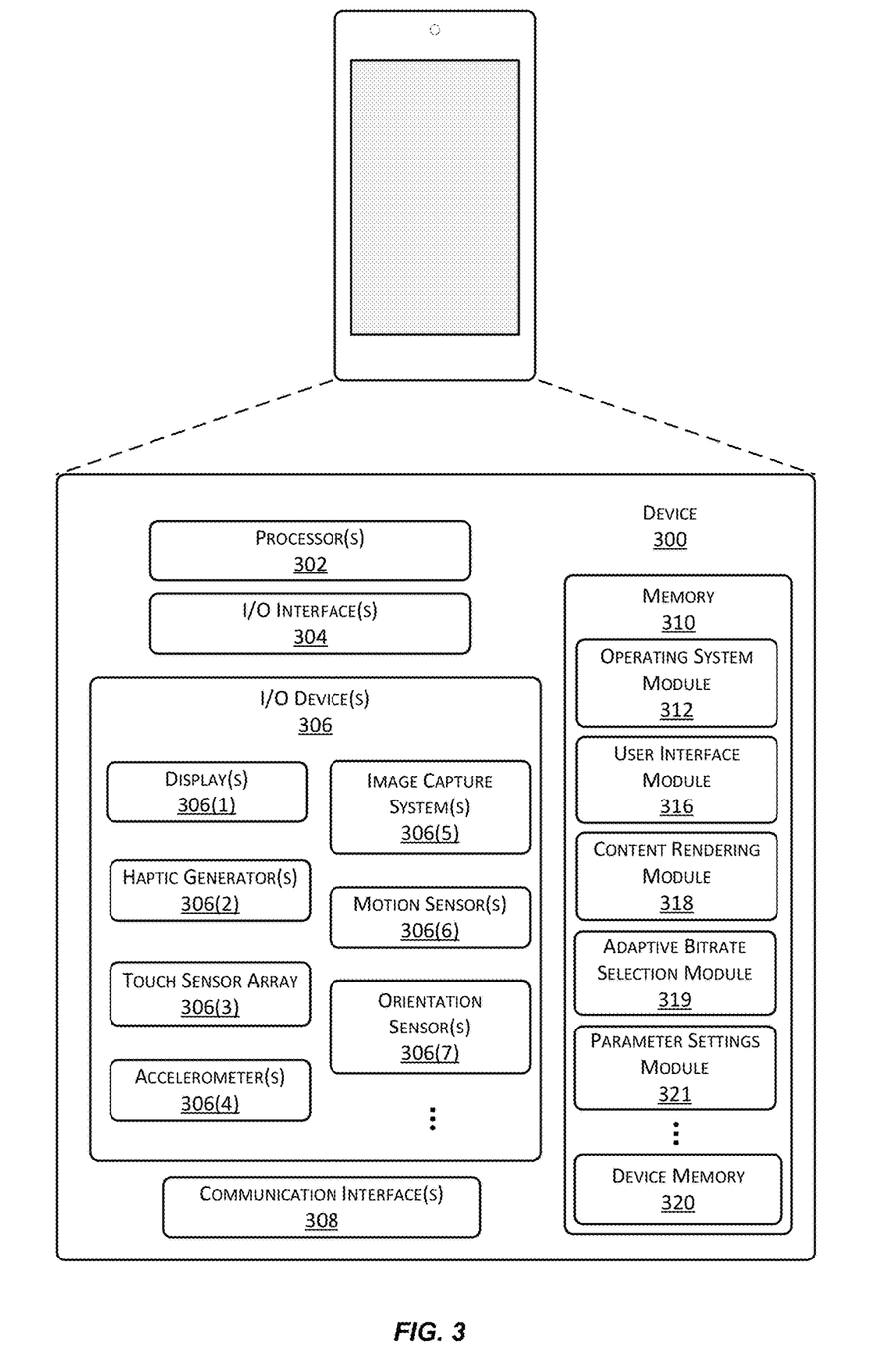
FIG. 3 is a simplified block diagram of an example of a client device with which various implementations may be practiced.

A block diagram of an example of a client device 300 suitable for use with various implementations is shown in FIG. 3. Device 300 includes one or more single or multi-core processors 302 configured to execute stored instructions (e.g., in device memory 320). Device 300 may also include one or more input/output (I/O) interface(s) 304 (e.g., an inter-integrated circuit (I2C) interface, a serial peripheral interface (SPI) bus, a universal serial bus (USB), an RS-232 interface, a media device interface, etc.) to allow the device to communicate with other devices. I/O interface(s) 304 is coupled to one or more I/O devices 306. Device 300 may also include one or more communication interfaces 308 configured to provide communications between the device and other devices. Such communication interface(s) 308 may be used to connect to cellular networks, personal area networks (PANs), local area networks (LANs), wide area networks (WANs), and so forth.

Device 300 also includes one or more memories (e.g., memory 310). Memory 310 includes non-transitory computer-readable storage media that may be any of a wide variety of types of volatile and non-volatile storage media including, for example, electronic storage media, magnetic storage media, optical storage media, quantum storage media, mechanical storage media, and so forth. Memory 310 provides storage for computer readable instructions, data structures, program modules, and other data for the operation of device 300. As used herein, the term "module" when used in connection with software or firmware functionality may refer to code or computer program instructions integrated to varying degrees with the code or computer program instructions of other such "modules." The distinct nature of the different modules described and depicted herein is used for explanatory purposes and should not be used to limit the scope of this disclosure.

Memory 310 includes at least one operating system (OS) module 312 configured to manage hardware resources such as I/O interfaces 304 and provide various services to applications or modules executing on processor(s) 302. Memory 310 also includes a user interface module 316, a content rendering module 318, adaptive bit rate selection module 319, and other modules. Memory 310 also includes device memory 320 to store a wide variety of instructions and information using any of a variety of formats including, for example, flat files, databases, linked lists, trees, or other data structures. Such information includes content for rendering and display on display 306(1) including, for example, any type of video content. Other information can include performance data associated with streaming sessions of device 300, as well as, historical performance data associated with streaming sessions of other devices with similar sessions characteristics as device 300. In some implementations, a portion of device memory 320 may be distributed across one or more other devices including servers, network attached storage devices, and so forth.

The logic or computer program instructions used to support and/or make decisions relating to optimizing parameter settings (represented by parameter settings module 321) may be implemented in a variety of ways. For example, module 321 might be implemented as part of bitrate selection module 319 on device 300 or, the logic might be one or more separate algorithms implemented to work in conjunction with bitrate selection module 319. Also or alternatively, module 321 may be implemented separately from the device's media player.

And as mentioned above, implementations are contemplated in which at least a portion of the logic or computer program instructions may reside on a separate platform, e.g., service 202, CDN 214, server 216, etc. Suitable variations and alternatives will be apparent to those of skill in the art. It will also be understood that device 300 of FIG. 3 is merely an example of a device with which various implementations enabled by the present disclosure may be practiced, and that a wide variety of other devices types may also be used (e.g., devices 206-1 to 206-5). The scope of this disclosure should therefore not be limited by reference to device-specific details.

A specific implementation will now be described with reference to the flow diagram of FIG. 4. Streaming sessions are established between media server 505 of FIG. 5 and client devices (402). For example, a streaming session may be established after a user requests playback of the first episode of The Man in the High Castle using a smartphone. The streaming session continues until the user chooses to stop playback, the episode ends, or the streaming of content terminates for some other reason. At any particular time, there might be many thousands of established streaming sessions. Each streaming session may be characterized by identifiable session characteristics examples of which are discussed below. During a streaming session, a client device (e.g., any of devices 206 of FIG. 2) receives manifest data (e.g., from server 203) to enable playback of the media content. The manifest data provides playback options for on-demand and/or live streaming of the media content. For example, the manifest data includes metadata indicating fragments of the media content available at different quality levels based on bitrates. The metadata allows the client device to generate properly formatted requests for specific fragments of the media content for playback on the client device.

In some implementations, manifest data can include information about the playback performance of a subset of streaming sessions. In addition, manifest data can include for instance, the playback performance of the subset included a rebuffering rate of 2% compared to a global rebuffering rate of 3%, which may facilitate selection of the parameter settings by the client device as discussed further below. For example, the client device may compare its rebuffering rate to the rebuffering rate of its subset and to the global rebuffering rate. If the client device had a rebuffering rate of 1%, this may be an indication that the initial parameter settings being used for the adaptive bitrate selection algorithm should not be changed. In addition to the playback performance information, manifest data may also include control parameter settings and test parameter settings to initially configure the adaptive bitrate selection algorithm. If a different client device had a rebuffering rate of 5%, the client device may compare the parameter settings currently being used to the parameter setting from the manifest and select the control parameters as way to improve the rebuffering rate in a similar manner to the other client devices of its subset.

Returning to FIG. 4, streaming sessions are identified according to session characteristics (404). Continuing with the example mentioned above, after processing the request for playback of the first episode of The Man in the High Castle, media server 505 determines that this streaming session should be included in a segment of sessions with similar characteristics. In the example of FIG. 5, the session characteristics of a particular segment represent mobile devices streaming in Huff, N. Dak. In another example, a different segment has session characteristics representing Amazon Fire TV Stick® users streaming in Seattle, Wash. using a wireless broadband internet. Other sessions characteristics that might be used to identify a segment of streaming sessions include, but are not limited to: internet service provider, operating system, type of media content (e.g., live streaming content or on-demand content), content delivery network, customer preference (e.g., a user can select a customization setting that indicates whether media content should be streamed at a higher quality level versus faster playback), bandwidth range, time of the day, the title of media content (e.g., The Man in the High Castle), or the popularity of media content. Session characteristics may vary according to different levels of specificity (e.g., a characteristic for a geographic location may be identifiable based on country, state, county, city, etc.). In general, sessions may be grouped according to any set of characteristics that facilitates the selection and/or refinement of parameter settings for adaptive bitrate selection algorithms as enabled by the present disclosure.

The characteristics by which segments of sessions are defined may be dynamic in that segments may be refined, changed, or adapted over time for a variety of reasons. For example, analysis of streaming sessions for mobile devices in Huff, N. Dak. using a cellular data network could lead to these sessions later being included in a larger segment that includes any mobile device in rural parts of the United States using a cellular data network. In another example, after receiving performance data from 6000 streaming sessions of a segment using a set of control parameter settings, media server 505 of FIG. 5 identifies 5000 of those sessions as having very negative playback performance (e.g., choppy playback during the entire streaming session). Media server 505 could then determine that these sessions received unsuitable parameter settings. As a result, a new and more narrowly tailored segment might be created based on the session characteristics of the 5000 streaming sessions. Also or alternatively, such poor performance could be an indication that these sessions might be better suited as part of another segment. As such, media server 505 might identify an existing segment having similar characteristics to the 5000 sessions as another way to provide more suitable parameter settings.

In some implementations, session characteristics are identified each time a user requests to stream media. Also or alternatively, session characteristics or segment identifiers may be stored after an initial identification (e.g., in quality assurance server 155 of FIG. 1) for subsequent identifications. Session characteristics or segment identifiers can also be stored at the client device in a local cache such as a cookie, metadata record of the client device, or as otherwise understood by those skilled in the art.

Returning to FIG. 4, the client devices corresponding to a subset of the streaming sessions identified at 404 are provided control parameter settings for their respective adaptive bitrate selection algorithm (406). In some implementations, control parameter settings are selected by a client device at the start of streaming sessions according, at least in part, to user preference. For example, a user may choose to customize parameter settings with a preference for reliability over quality. As such, at the start of a streaming session the client device can select parameter settings that include a lower quality level than the default quality level. In other implementations, media server 505 of FIG. 5 provides control parameter settings 510a to the client devices associated with subset 520a. The client devices corresponding to a different subset of the streaming sessions identified at 404 can be provided test parameter settings (408). For example, media server 505 may provide test parameter settings 515a to client devices corresponding to subset 525a. The subsets within a particular segment of streaming sessions can vary in number and size (e.g., as discussed below with reference to FIG. 6), but preferably, there will be at least one control subset and at least one test subset. In the example of FIG. 5, subset 520a represents a control subset that includes, for example, approximately 90% of the streaming sessions identified at

404. Subset 525*a* represents a test subset that includes, for example, approximately 10% of the streaming sessions identified at 404. In another example, a control subset can include approximately 50% of the streaming sessions, and each of two subsets can include approximately 25% of the remaining streaming sessions. Also or alternatively, each subset can include a similarly sized portion of a particular segment of streaming sessions, for instance, a control subset includes 25% of the streaming sessions and each of three test subsets includes 25%. However, as mentioned above, the size and number can vary considerably.

As will be appreciated, it is desirable that the parameter settings provided to a client device optimize playback performance on the client device. According to various implementations, a variety of test parameter settings may be sent to client devices corresponding to subsets of streaming sessions within a segment. The test parameter settings may be updated and refined over time. In some implementations, instead of a server sending parameter settings to the client device, the client device might select parameter settings from parameter settings already stored on the client device. For example, the parameter settings stored on the client device might be a list of particularly reliable parameter settings included as part of a firmware update that is based off historical performance data from previous streaming sessions. Historical performance data may be analyzed to facilitate selection of parameter settings according to patterns of performance over a period of time. For example, a client device may stream media content under streaming conditions similar to mobile device users in Huff, N. Dak. using a cellular data network. As such, the client device may periodically attempt to refine parameter settings according to an optimizing pattern used by the subset of Huff, N. Dak. streaming sessions.

In a particular use case, streaming conditions may deteriorate temporarily for a segment of sessions with the same ISP. As a result, test parameter settings for subsequent sessions might be generated and provided in response to the changed streaming conditions (e.g., initial quality level may be reduced from 1080p to 720p). Not being limited to the example above, test parameter settings might also include incremental adjustments to one or more of the parameter settings (e.g., an increase in buffer size from 8 seconds to 8.1 seconds). In FIG. 5, test parameter settings 515*a* include an initial quality level of 1080p, a buffer size of 8 seconds, and a "time to first frame" of 6 seconds (i.e., the amount of time within which playback must begin). The buffer size of 8 seconds represents a 2 second increase over control parameter settings 510*a*, which includes an initial quality level of 1080p, a buffer size of 6 seconds, and "time to first frame" of 6 seconds.

The parameters themselves may be the same or similar across client devices, but the parameter settings are adjustable. For example, one parameter might be initial quality level while a setting for that parameter is 1080p which may be adjusted up to 4K or down to 720p. However, adjustments to some parameter settings are not limited to discrete levels. That is, parameter settings may be adjusted according to varying levels of specificity. Some other examples of parameters that may be adjusted include, but are not limited to: maximum quality level during playback, minimum quality level during playback, maximum quality difference when changing quality level (e.g., quality level may be increased from 720p to 1080p, but not from 720p to 4K), resolution size, customer preference, fragment size, buffer size, time to first frame, or bandwidth limit.

Returning to FIG. 4, performance data representing playback of content on the client devices associated with the segment is received (412). For example, in FIG. 5 performance data 530*a* is received by media server 505 from the client devices corresponding to subset 520*a*, and performance data 530*b* is received by media server 505 from the client devices corresponding to subset 525*a*. The performance data that is received can include, but is not limited to: a number of dropped media content frames, a number of rebuffering events during playback, average client device bandwidth during playback, a number of fatal errors, a number of download retries, average quality level for streaming session, number of quality level switches, average buffer level for streaming session, and durations of unsmooth playback. After a sufficiently large number of streaming sessions for a given segment are received (e.g., 100,000), media server 505 may determine that sufficient performance data is available for comparison of the performance data associated with the different subsets of the segment. Also or alternatively, performance data might be periodically captured and stored according to time intervals. For example, media server 505 may automatically capture and store performance data every hour, day, week, month, etc. Also or alternatively, performance data might be stored at the client device for streaming sessions particular to that client device.

Returning to FIG. 4, the performance data received at 410 is compared (412). In the example of FIG. 5, performance data 530*a* is compared with performance data 530*b* by media server 505. In some implementations, simple comparisons between one or more performance metrics related to playback performance might be used. Alternatively, performance scores for each set of parameter settings might be calculated using any of a variety of combinations of the performance metrics.

For example, performance data 530*a* might indicate that 5% of the sessions of subset 520*a* experienced rebuffering events during playback (i.e., the rebuffer frequency rate), while performance data 530*b* might indicate that 1% of the sessions of subset 525*a* experienced rebuffering events. A simple comparison shows that the rebuffer rate for the sessions of subset 525*a* was better. Alternatively, the test subset with a better playback performance may be assigned a score for the metric based on the difference between playback performance compared to the playback performance of the control subset. In this example, media server 505 can generate a score of 4 points for subset 525*a* because the rebuffer frequency rate is 4 percentage points lower than the rebuffer rate of subset 520*a*. While performance scores may be calculated according to differences in percentages, performance scores can also be calculated in other ways. For example, a single point may be assigned to test parameter settings of a test subset that performs better than a control subset. Additionally, a single point may be assigned for each performance metric where the test parameter settings outperform the control parameter settings. For example, a comparison of performance data can indicate that time to first frame was 3% longer for the control subset than the test subset. The comparison of performance data can also indicate that the average quality delivered was 3% lower for the control subset than the test subset. In addition, the performance data can indicate that that the rebuffer frequency rate was 4% higher for the control subset than the test subset. As a result, the test parameter settings of the test subset is assigned 1 point for each of the performance metrics because the test parameter settings outperformed each of the control parameter settings. As will be appreciated, a wide variety of models known to those skilled in the art can be used to facilitate comparison for the purpose of determining the relative playback performance of different sets of parameter settings.

In some implementations, performance scores are aggregated to provide an aggregated performance score for each set of parameter settings. An aggregate performance score can include the sum of each performance metric. For example, if the test parameter settings of a test subset outperformed the control parameter settings of a control subset by 5% in each of 3 performance metrics, the aggregate performance score would be 15 for the test parameter settings. Also or alternatively, the value of each performance metric may be normalized according to a common scale using the same unit such as standard deviation. For example, if test parameter settings had an average of 1% rebuffer frequency rate and a standard deviation of 0.15%, then each value in the frequency rate performance metric can be calculated to find its Z-score, e.g., (1.3%−1%)/0.15%=2. Similarly, if test parameter settings had an average quality level of 1000 and a standard deviation of 150, then each value in the frequency rate performance metric can be calculated to find its Z-score, e.g., (1080−1000)/150=~0.5. The aggregate performance score could be the sum of Z-scores, e.g., 2+0.5+X+Y+Z+ . . . . As such, the values of different performance metrics can be combined in a meaningful manner despite having different units of measurement. It will be understood by those skilled in the art that a variety of normalization techniques may be used prior to averaging performance metrics in order to make the performance metrics comparable to each other.

As part of the aggregation process different performance metrics might be weighted differently to contribute more or less to the aggregate score. For example, a rebuffer frequency rate may be more significant than time to first frame such that a 5% rebuffer rate would contribute more to an aggregate performance score than an average quality level of 1000. Also, performance metrics may be weighted based on how close the test subset value is to the control subset value. When compared between the two subsets, the closer that the two values are to each other, the more the performance metric might be weighted so as to contribute more to the aggregate scores. For example, a 1% difference in rebuffer rate in one comparison might be weighted more than a 5% difference in rebuffer rate in another comparison.

In some implementations, comparison of performance data might be implemented on a device different from the device providing the media content to the playback devices. For example, media server 120 of FIG. 1 can send performance data 150*d* to quality assurance server 155. Quality assurance server 155 may perform some or all of the analysis discussed above so as to distribute processing workload away from media server 120 and not interrupt playback on the client devices of subsets 130*a* and 130*b*. In addition, quality assurance server 155 may store and maintain logs, performance data, control parameter settings, and test parameter settings for each segment and each subset of segments. Also or alternatively, comparison of performance data might be implemented on a client device. In some implementations, after a first streaming session ends and before a second streaming session is established, the client device may compare the performance data of a first streaming session to past streaming sessions on that client device. As an example, the next streaming session might include a parameter setting for a higher quality level. The next streaming session can be compared to the previous streaming session, which may indicate that the second streaming session rebuffered more frequently than the first streaming session and resulted in worse playback performance.

Returning to FIG. 4, it may be determined that test parameter settings corresponded to better playback performance relative to control parameter settings (414). For example, after comparing performance data 530*a* and 530*b*, media server 505 determines the increase in buffer size to 8 seconds correlated with better playback performance for client devices in subset 525*a* over the playback performance for client devices in subset 520*a* using a 6 second buffer size. In some implementations, the determination at 414 uses a confidence threshold. For example, such a confidence threshold might be a value that that should be less than the difference between corresponding performance metrics in order for a media server 505 to consider that difference in a decision to designate the test parameter settings as control parameter settings. Continuing with the example discussed above, subset 520*a* has a rebuffering frequency rate of 5% while subset 525*a* has a rebuffering rate of 1%. If a confidence threshold of 3 was set, then the test parameter settings might be designated as new control parameter settings, whereas if the confidence threshold was set to 4, then the test parameter settings would not be designated as new control parameter settings.

In some cases, the test parameter settings might not result in better playback performance relative to the control parameter settings. For example, after the performance data at 412 is compared, media server 505 of FIG. 5 can determine that the subset 525*a* had an average lower quality level than subset 520*a*, subset 525*a* had a higher rebuffer rate than subset 520*a*, and/or subset 525*a* had a higher time to first frame than subset 520*a*. As discussed further below, the test parameter settings in this example would not be designated as the new control parameter settings.

Returning to FIG. 4, where the test parameter settings are determined to result in better playback performance than the control parameter settings (414), the test parameter settings are designated as new control parameter settings (416). Designating by media server 505 of FIG. 5 might occur in a variety of ways. A new data structure based on the test parameter settings might be created by media server 505. For example, media server 505 might generate and provide new control parameter settings 510*b* to client devices corresponding to subset 520*b*. In another example, a control pointer might be reassigned from the control parameter settings to the test parameter settings. In another example, one or more of the settings in the control parameter settings might be modified such that they match the test parameter settings. The manner in which the designation occurs may also be implemented in other ways as understood by those skilled in the art.

Returning to FIG. 4, whether or not the test parameter settings resulted in better playback performance than the control parameter settings (414), new test parameter settings are generated (418). Using the example mentioned above, when media server 505 of FIG. 5 determines that the 2 second increase in buffer size correlated with better playback performance, media server 505 generates and provides new test parameter settings 515*b* to client devices corresponding to subset 525*b*. Also or alternatively, instead of generating new parameter settings, existing parameter settings can be updated and/or modified.

In the example of FIG. 5, new control parameter settings 510*b* include an initial quality level of 1080p, a buffer size of 8 seconds, and a time to first frame of 6 seconds (i.e., the values of test parameter settings 515*a*). The buffer size of 8 seconds represents the new control parameter setting for buffer size. New test parameter settings 515*b* include an initial quality level of 1080p, a buffer size of 9 seconds, and a time to first frame of 6 seconds. The 1 second increase in buffer size for new test parameter settings 515*b* can represent a further attempt to optimize parameter settings. In some implementations, new test parameter settings are generated based on performance data 530*a* and 530*b*. For example, if a control subset had significant performance issues (e.g., the buffer is never filled to capacity during a session) due to a state-wide decrease in available downstream bandwidth, then adjustments to multiple parameter settings (e.g., decrease quality level and/or increase time to first frame) can occur to address this significant decrease in bandwidth.

Figure 4:
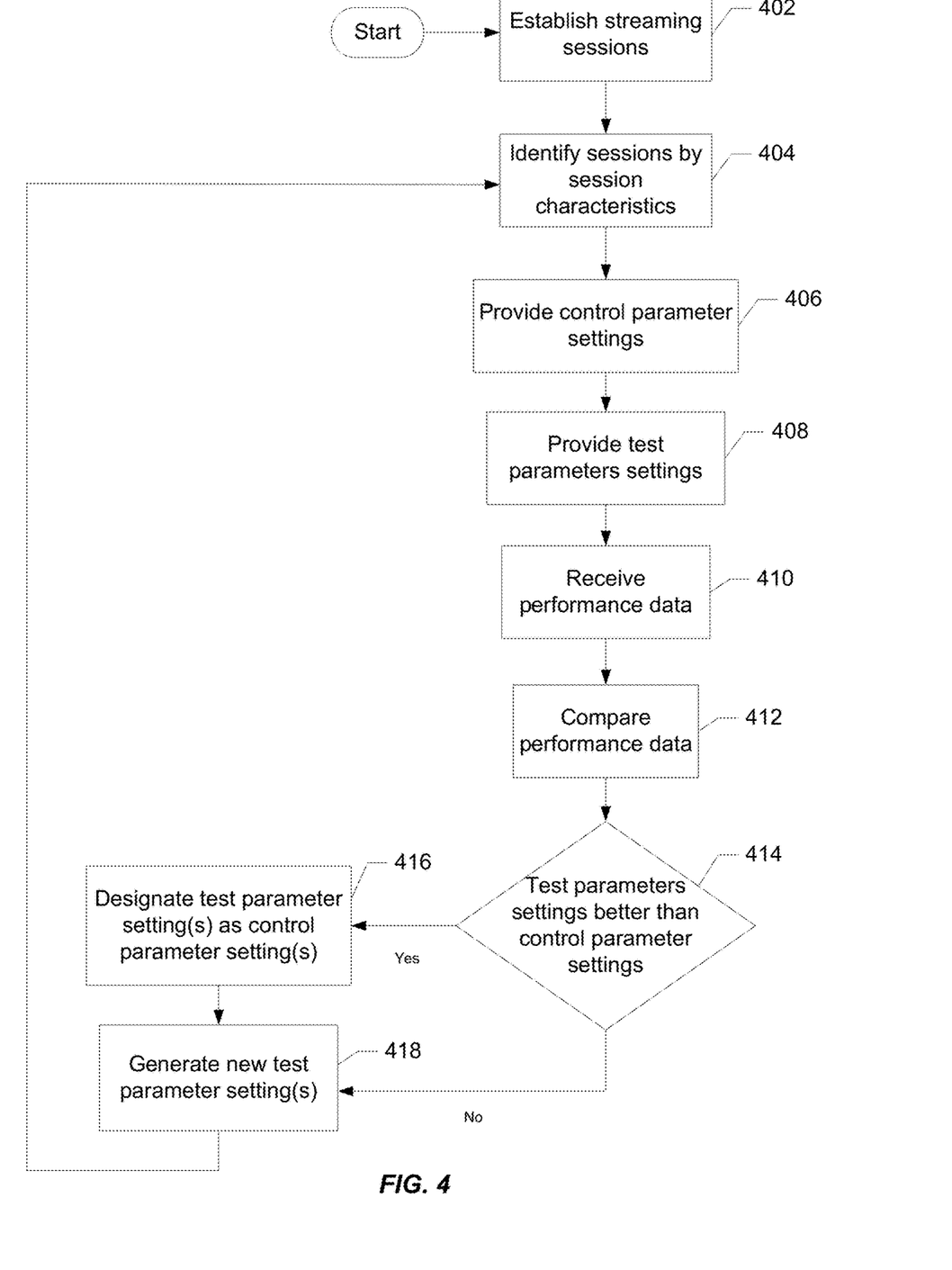
FIG. 4 is a flowchart illustrating operation of a particular implementation.
Figure 5:
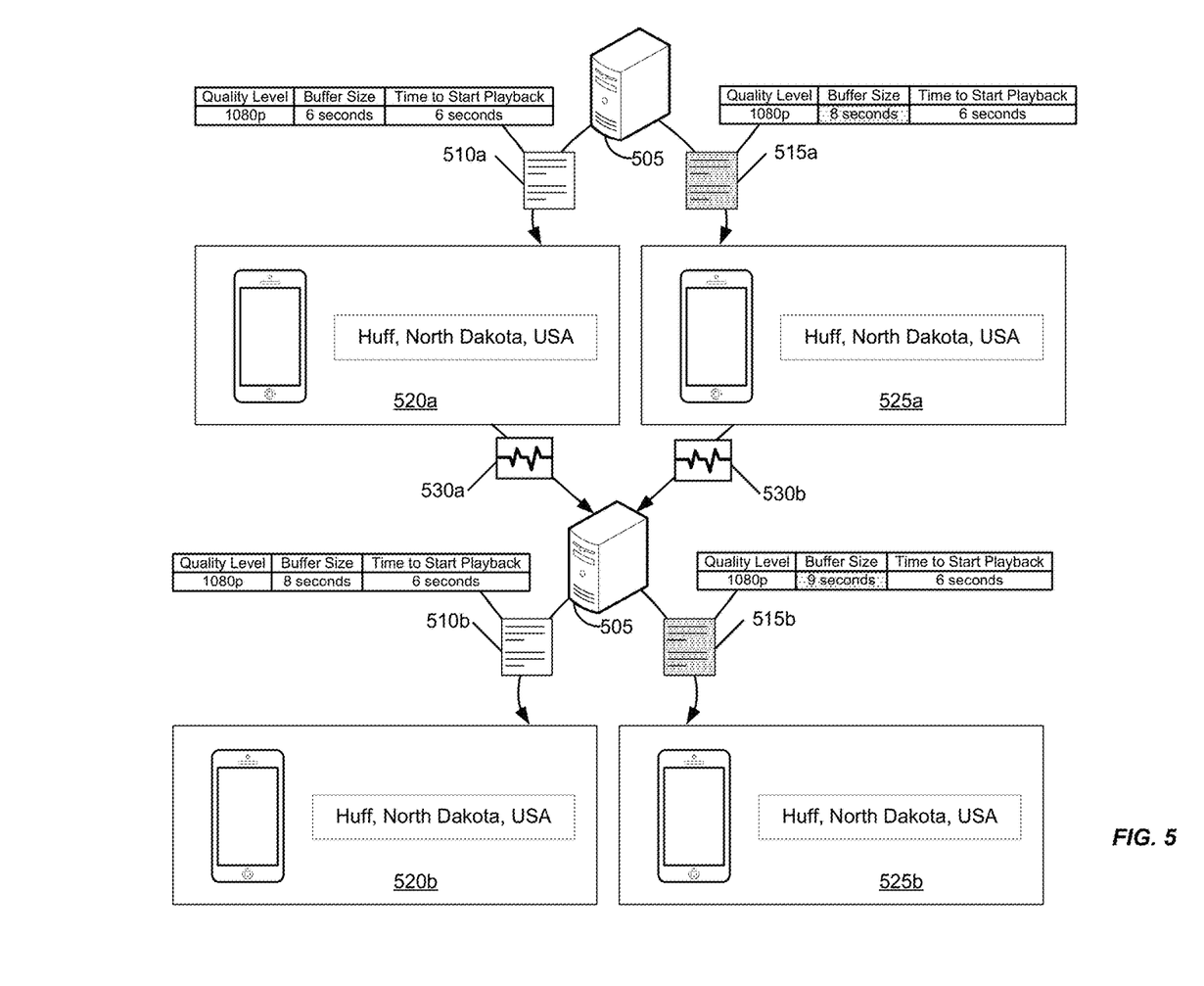
FIG. 5 illustrates an example of adjusting parameter settings for bitrate selection algorithms.

As will be appreciated, the functionality represented by 404-418 of the flow diagram of FIG. 4 may be performed simultaneously for multiple segments and iterated within each segment to refine the parameter settings for each segment. In some implementations, new streaming sessions are identified according to similar session characteristic identified at 404. If test parameter settings are determined to result in better playback performance than the control parameter settings, then new control parameter settings are provided to a control subset within that segment. In addition, new test parameter settings from 418 are provided to a test subset within that segment.

Figure 6:
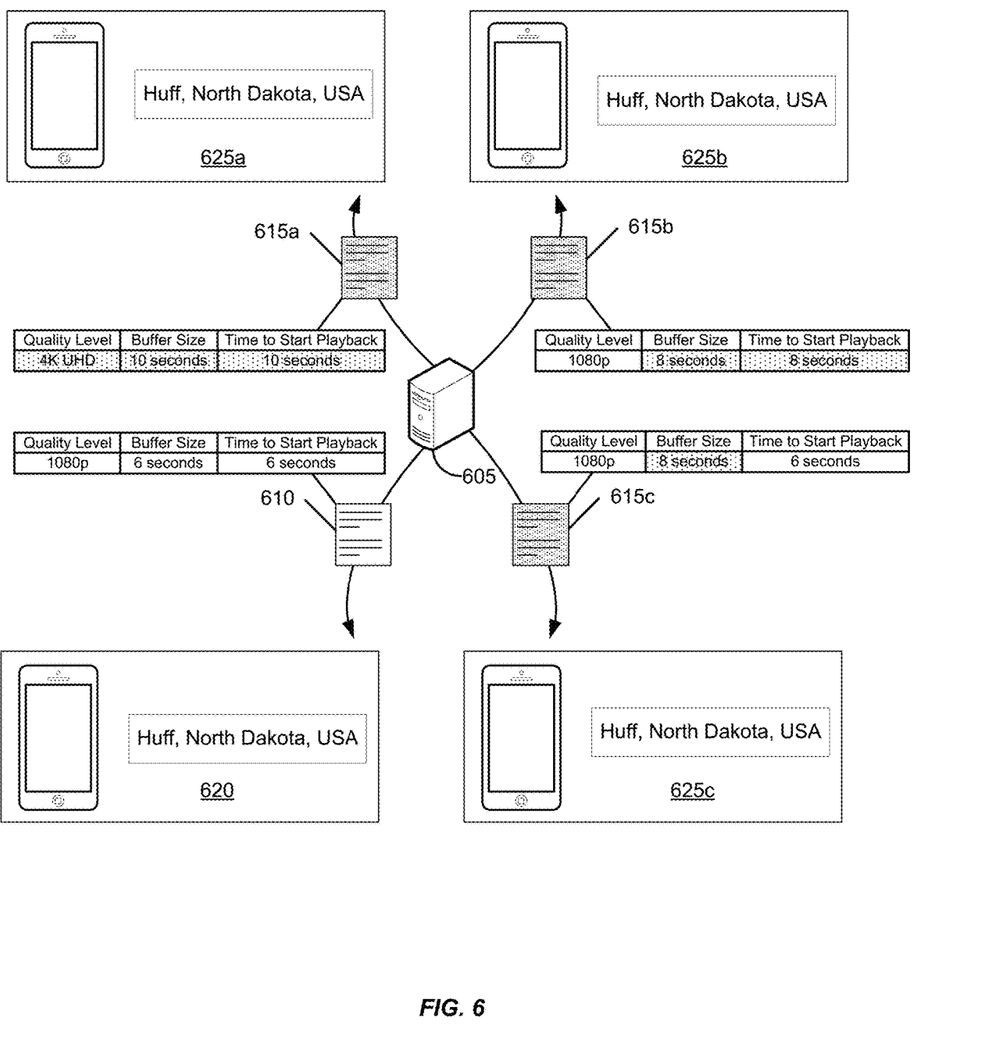
FIG. 6 illustrates an example of providing parameter settings to client devices corresponding to subsets of streaming sessions.

In some implementations, in order to refine control parameter sets for streaming sessions, multiple test parameter sets are provided to multiple test subset within a segment at a given time. FIG. 6 illustrates an example in which parameter settings are provided to the client devices corresponding to more than two subsets of a particular segment of streaming sessions. In FIG. 6, media server 605 provides three sets of test parameter settings 615*a-c* to the client devices associated with test subsets 625*a-c* and one set of control parameter settings to the client devices of control subset 620. As seen in FIG. 6, the sets of parameter settings for each of the test subsets are different. Test parameter settings 615*a* includes three parameter settings that are different from control parameter settings 610, test parameter settings 615*b* includes two parameter settings that are different from control parameter settings 610, and test parameter settings 615*c* includes one parameter setting that is different from control parameter settings 610. As will be appreciated, many different arrangements of subsets and parameter settings can be made and are not limited to the examples discussed above.

In some implementations, the iteration of 404-418 of FIG. 4 may involve the use of machine-learning techniques. For example, an administrator can configure a set a rules defining a target playback experience for one or more segments. During the iteration process, media server 505 of FIG. 5 uses these rules to analyze the performance data received from client devices corresponding to control subsets and test subsets. As the volume of performance data grows, the accuracy of the applied rules increases so as to create increasingly nuanced and reliable parameter settings. For example, a playback constraint exists between time to first frame and buffer size such that if time to first frame is decreased too much, the buffer size reaches a point at which it is too large to buffer fully. With a rule configured to optimize playback in light of this constraint, analysis of performance data can lead to identifying patterns that can approximate the bounds of the playback constraint. For example, a time to first frame parameter setting can be generated according to identified patterns indicating that time to first frame cannot be below 5 seconds without also increasing buffer size. As will be appreciated, machine-learning techniques are not limited to the example above. Many different machine-learning techniques may also be used as understood by those skilled in the art.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well-known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A computer program product comprising one or more non-transitory computer-readable media having computer instructions stored therein, the computer program instructions being configured such that, when executed by one or more computing devices, the computer program instructions cause the one or more computing devices to:

request first media content for playback on a client device configured to stream the first media content according to parameters that govern operation of an adaptive bitrate selection algorithm at a session level;

as part of initiation of a first session for streaming the first media content, select a first control set of parameter settings for the parameters of the adaptive bitrate selection algorithm;

conduct the first session for the first media content using the adaptive bitrate selection algorithm configured with the first control set of parameter settings;

store first performance data representing playback of the first media content by the client device during the first session, the first performance data representing one or more of: a first average quality level during playback during the first session, a first number of rebuffering events during the first session, or a first average time to first frame during the first session;

calculate a first performance score for the first control set of parameter settings based on the first performance data, the first performance score representing a first frequency rate of rebuffering events in relation to average quality delivered during playback;

request second media content;

as part of initiation of a second session for streaming the second media content, select a first test set of parameter settings for the parameters of the adaptive bitrate selection algorithm, the first test set of parameter settings including at least one parameter setting different from the first control set of parameter settings;

conduct the second session for the second media content using the adaptive bitrate selection algorithm configured with the first test set of parameter settings;

store second performance data representing playback of the second media content by the client device during the second session, the second performance data representing one or more of: a second average quality level during playback during the second session, a second number of rebuffering events during the second session, or a second average time to first frame during the second session;

calculate a second performance score for the first test set of parameter settings based on the second performance data, the second performance score representing a second frequency rate of rebuffering events in relation to average quality delivered during playback, wherein the second frequency rate is less than first frequency rate;

compare the first performance data with the second performance data;

determine, based on the comparison, that the first test set of parameter settings corresponded to better playback performance than the first control set of parameter settings, including determining that the second performance score exceeds a confidence threshold in relation to the first performance score, wherein the confidence threshold is less than a difference of the second frequency rate and the first frequency rate;

designate the first test set of parameter settings as a second control set of parameter settings;

request third media content;

as part of initiation of a third session for streaming the third media content, select the second control set of parameter settings for the parameters of the adaptive bitrate selection algorithm; and conduct the third session for the third media content using the adaptive bitrate selection algorithm configured with the second control set of parameter settings.

2. The computer program product of claim 1, wherein the parameters associated with the adaptive bitrate selection algorithm include one or more of: an initial quality level of playback of media content, a maximum quality level of playback of media content, a minimum quality level of playback of media content, a buffer size for storing portions of media content, a time to first frame of media content, or a bandwidth limit.

3. A client device, comprising:
memory; and
one or more processors configured, in conjunction with the memory, to:
request first media content for playback according to parameters that govern operation of an adaptive bitrate selection algorithm at a session level;
as part of initiation of a first session for streaming the first media content, select first parameter settings for the parameters of the adaptive bitrate selection algorithm;
conduct the first session for the first media content using the adaptive bitrate selection algorithm configured with the first parameter settings;
calculate a first performance score for the first parameter settings based on performance data associated with the playback of the first media content, the first performance score representing a first frequency rate of rebuffering events in relation to average quality delivered during playback;
request second media content;
as part of initiation of a second session for streaming the second media content, select second parameter settings for the parameters of the adaptive bitrate selection algorithm;
conduct the second session for the second media content using the adaptive bitrate selection algorithm configured with the second parameter settings;
calculate a second performance score for the second parameter settings based on performance data associated with the playback of the second media content, the first performance score representing a second frequency rate of rebuffering events in relation to average quality delivered during playback, wherein the second frequency rate is less than first frequency rate;
determine that the second parameter settings resulted in better playback performance than the first parameter settings based on a difference between the first performance score and the second performance score exceeding a confidence threshold;
request third media content;
based on determining that the second parameter settings resulted in better playback performance, and as part of initiation of a third session for streaming the third media content, select the second parameter settings for the parameters of the adaptive bitrate selection algorithm; and
conduct the third session for the third media content using the adaptive bitrate selection algorithm configured with the second parameter settings.

4. The client device of claim 3, wherein the one or more processors are configured to determine that the second parameter settings resulted in better playback performance than the first parameter settings using performance data corresponding to the playback of the first media content and the second media content, the performance data including one or more of: an average quality level during playback, a number of rebuffering events, or an average time to first frame.

5. The client device of claim 3, wherein the parameters of the adaptive bitrate selection algorithm include one or more of: an initial quality level of playback of media content, a maximum quality level of playback of media content, a minimum quality level of playback of media content, a buffer size for storing portions of media content, a time to first frame of media content, or a bandwidth limit.

6. The client device of claim 3, wherein the one or more processors are further configured to:
select third parameter settings for the parameters of the adaptive bitrate selection algorithm;
determine that the third parameter settings resulted in worse playback performance than the second parameter settings;
request fourth media content for playback according to the parameters of the adaptive bitrate selection algorithm; and
based on determining that the third parameter settings resulted in worse playback performance, select fourth parameter settings for the parameters of the adaptive bitrate selection algorithm, the fourth parameter settings being a modified version of the third parameter settings.

7. The client device of claim 3, wherein the second parameter settings include at least one parameter setting different from the first parameter settings.

8. The client device of claim 3, wherein the one or more processors are configured to receive manifest data identifying control parameter settings and one or more test parameter settings in response to requesting the first media content.

9. The client device of claim 3, wherein the one or more processors are configured to request the first media content by providing session characteristics corresponding to a subset of streaming sessions having one or more session characteristics in common.

10. The client device of claim 9, wherein the one or more session characteristics include one or more of: a type of communication connection, a geographic location, or a device type.

11. A computer implemented method, comprising:
requesting first media content for playback according to parameters that govern operation of an adaptive bitrate selection algorithm at a session level;
as part of initiation of a first session for streaming the first media content, selecting first parameter settings for the parameters of the adaptive bitrate selection algorithm;
conducting the first session for the first media content using the adaptive bitrate selection algorithm configured with the first parameter settings;
calculating a first performance score for the first parameter settings based on performance data associated with the playback of the first media content, the first performance score representing a first frequency rate of rebuffering events in relation to average quality delivered during playback;
requesting second media content;
as part of initiation of a second session for streaming the second media content, selecting second parameter settings for the parameters of the adaptive bitrate selection algorithm;
conducting the second session for the second media content using the adaptive bitrate selection algorithm configured with the second parameter settings;
calculating a second performance score for the second parameter settings based on performance data associated with the playback of the second media content, the second performance score representing a second frequency rate of rebuffering events in relation to average quality delivered during playback, wherein the second frequency rate is less than first frequency rate;
determining that the second parameter settings resulted in better playback performance than the first parameter settings based on a difference between the first performance score and the second performance score exceeding a confidence threshold;
requesting third media content;
based on determining that the second parameter settings resulted in better playback performance, and as part of initiation of a third session for streaming the third media content, selecting the second parameter settings for the parameters of the adaptive bitrate selection algorithm; and
conducting the third session for the third media content using the adaptive bitrate selection algorithm configured with the second parameter settings.

12. The computer implemented method of claim 11, wherein determining that the second parameter settings resulted in better playback performance than the first parameter settings is done using performance data corresponding to the playback of the first media content and the second media content, the performance data including one or more of: an average quality level during playback, a number of rebuffering events, or an average time to first frame.

13. The computer implemented method of claim 11, wherein the parameters of the adaptive bitrate selection algorithm include one or more of: an initial quality level of playback of media content, a maximum quality level of playback of media content, a minimum quality level of playback of media content, a buffer size for storing portions of media content, a time to first frame of media content, or a bandwidth limit.

14. The computer implemented method of claim 11, further comprising: selecting third parameter settings for the parameters of the adaptive bitrate selection algorithm; determining that the third parameter settings resulted in worse playback performance than the second parameter settings; requesting fourth media content for playback according to the parameters of the adaptive bitrate selection algorithm; and based on determining that the third parameter settings resulted in worse playback performance, selecting fourth parameter settings for the parameters of the adaptive bitrate selection algorithm, the fourth parameter settings being a modified version of the third parameter settings.

15. The computer implemented method of claim 11, wherein the second parameter settings include at least one parameter setting different from the first parameter settings.

16. The computer implemented method of claim 11, wherein requesting the first media content includes a request for manifest data identifying control parameter settings and one or more test parameter settings.

17. The computer implemented method of claim 11, wherein requesting the first media content includes providing session characteristics corresponding to a subset of streaming sessions having one or more session characteristics in common.

18. The computer implemented method of claim 17, wherein the one or more session characteristics include one or more of: a type of communication connection, a geographic location, or a device type.

* * * * *